US012037024B1

(12) United States Patent
Denny et al.

(10) Patent No.: US 12,037,024 B1
(45) Date of Patent: Jul. 16, 2024

(54) TRAJECTORY PLANNING WITH OTHER ROAD USER REACTIONS FOR AUTONOMOUS VEHICLES

(71) Applicant: Waymo LLC, Mountain View, CA (US)

(72) Inventors: Jory Denny, Sunnyvale, CA (US); Ryan Luna, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 177 days.

(21) Appl. No.: 17/506,498

(22) Filed: Oct. 20, 2021

(51) Int. Cl.
*B60W 60/00* (2020.01)
*B60W 30/18* (2012.01)
*B60W 40/10* (2012.01)

(52) U.S. Cl.
CPC ........ *B60W 60/0027* (2020.02); *B60W 40/10* (2013.01); *B60W 30/18145* (2013.01); *B60W 30/18163* (2013.01); *B60W 60/00253* (2020.02); *B60W 2554/801* (2020.02); *B60W 2554/802* (2020.02)

(58) Field of Classification Search
CPC ....... B60W 60/0027; B60W 60/00253; B60W 2554/802; B60W 2554/801; B60W 30/18145; B60W 30/18163
See application file for complete search history.

(56) References Cited

U.S. PATENT DOCUMENTS

| | | | |
|---|---|---|---|
| 2018/0011496 A1* | 1/2018 | Fairfield | ............ B60W 60/0011 |
| 2019/0384304 A1 | 12/2019 | Towal et al. | |
| 2020/0406892 A1* | 12/2020 | Yu | .......................... B60W 10/20 |
| 2021/0046924 A1* | 2/2021 | Caldwell | ........... B60W 30/0956 |
| 2021/0055732 A1* | 2/2021 | Caldwell | ................ G08G 1/167 |
| 2021/0229656 A1* | 7/2021 | Dax | .................... G08G 1/09626 |
| 2021/0354729 A1* | 11/2021 | Ng | .................... B60W 60/0018 |
| 2022/0340138 A1* | 10/2022 | Seegmiller | ........ B60W 60/0015 |
| 2022/0349721 A1* | 11/2022 | Hukkeri | ............. G01C 21/3453 |

FOREIGN PATENT DOCUMENTS

| | | |
|---|---|---|
| WO | 2019231521 A1 | 12/2019 |
| WO | 2020079066 A1 | 4/2020 |

OTHER PUBLICATIONS

Zhou, Wei , et al., "Automated Process for Incorporating Drivable Path into Real-time Semantic Segmentation", 2018 IEEE International Conference on Robotics and Automation (ICRA), pp. 6039-6044.

* cited by examiner

*Primary Examiner* — Jaime Figueroa
*Assistant Examiner* — Mohamad O El Sayah
(74) *Attorney, Agent, or Firm* — Botos Churchill IP Law

(57) ABSTRACT

Aspects of the disclosure provide a method of processing trajectories. For instance, a planned trajectory may be received. A behavior prediction of the other road user may be received. For a sub portion of a plurality of sub portions of the planned trajectory, whether the sub portion conflicts with the behavior prediction of the other road user may be determined. When the sub portion is determined to conflict, whether the sub portion and the behavior prediction of the other road user meet at least one of a plurality of sets of preconditions may be determined. When the sub portion and the behavior prediction of the other road user are determined to meet at least one of the plurality of sets of preconditions, the planned trajectory may be annotated with a reaction for the other road user. The annotated planned trajectory may be used to control the autonomous vehicle.

22 Claims, 11 Drawing Sheets

400

TRAJECTORY PLANNING WITH OTHER ROAD USER REACTIONS FOR AUTONOMOUS VEHICLES

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings.

BRIEF SUMMARY

Aspects of the disclosure provide a method of processing trajectories for autonomous vehicles. The method includes receiving, by one or more processors, a planned trajectory including a plurality of sub portions; receiving, the by one or more processors, a behavior prediction for another road user; for a sub portion of the plurality of sub portions, determining, the by one or more processors, whether the sub portion conflicts with the behavior prediction of the other road user; when the sub portion is determined to conflict with the behavior prediction of the other road user, determining, by the one or more processors, whether the sub portion and the behavior prediction of the other road user meet at least one of a plurality of sets of preconditions; when the sub portion and the behavior prediction of the other road user are determined to meet at least one of the plurality of sets of preconditions, annotating, by the one or more processors, the planned trajectory with a reaction for the other road user; and using, by the one or more processors, the annotated planned trajectory to control the autonomous vehicle in an autonomous driving mode.

In one example, the sub portion is determined to conflict with the behavior prediction of the other road user when the sub portion and the behavior prediction overlap. In another example, the sub portion is determined to conflict with the behavior prediction of the other road user when the sub portion and the behavior prediction are within a predetermined distance in space or time. In another example, the sub portion is determined to conflict with the behavior prediction of the other road user when a potential motion of the autonomous vehicle in the sub portion necessitates a reaction by the other road user to the potential motion by the autonomous vehicle. In another example, each of the plurality of sets of preconditions corresponds to a specific scenario. In another example, each of the plurality of sets of preconditions includes the autonomous vehicle attempting a particular maneuver. In this example, the particular maneuver includes a lane change. In addition or alternatively, the particular maneuver includes merging with other road users. In addition or alternatively, the particular maneuver includes making an unprotected turn. In addition or alternatively, the particular maneuver includes crossing over a lane of traffic. In addition or alternatively, the particular maneuver includes crossing over a bicycle lane. In another example, at least one of the plurality of sets of preconditions includes the other road user approaching the autonomous vehicle from behind. In another example, at least one of the plurality of sets of preconditions includes the other road user being able to stop within predetermined deceleration constraints. In another example, the method also includes: iterating through each of the plurality of sub portions to determine whether any of the plurality of sub portions conflicts with a behavior prediction of a second road user; when the sub portion conflicts with the behavior prediction of the second road user, determining whether the sub portion and the behavior prediction of the other road user meet at least one of the plurality of sets of preconditions; and when the sub portion and the behavior prediction of the second road user meet at least one of the plurality of sets of preconditions, further annotating the planned trajectory with a reaction for the second road user. In another example, the method also includes, when the sub portion and the behavior prediction of the other road user does not meet at least one of the plurality of sets of preconditions, discarding the planned trajectory.

Another aspect of the disclosure provides a system for processing trajectories for autonomous vehicles. The system includes on or more processors configured to: receive a planned trajectory including a plurality of sub portions; receive a behavior prediction of another road user; for a sub portion of the plurality of sub portions, determine whether the sub portion conflicts with the behavior prediction of the other road user; when the sub portion is determined to conflict with the behavior prediction of the other road user, determine whether the sub portion and the behavior prediction of the other road user meet at least one of a plurality of sets of preconditions; when the sub portion and the behavior prediction of the other road user are determined to meet at least one of the plurality of sets of preconditions, annotate the planned trajectory with a reaction for the other road user; and use the annotated planned trajectory to control the autonomous vehicle in an autonomous driving mode.

In one example, wherein the sub portion is determined to conflict with the behavior prediction of the other road user when the sub portion and the behavior prediction overlap. In another example, each of the plurality of sets of preconditions includes the autonomous vehicle attempting a particular maneuver. In another example, the one or more processors are further configured to: iterate through each of the plurality of sub portions to determine whether any of the plurality of sub portions conflicts with a behavior prediction of a second road user; when the sub portion conflicts with the behavior prediction of the second road user, determine whether the sub portion and the behavior prediction of the other road user meet at least one of the plurality of sets of preconditions; and when the sub portion and the behavior prediction of the second road user meet at least one of the plurality of sets of preconditions, further annotate the planned trajectory with a reaction for the second road user. In another example, the one or more processors are further configured to, when the sub portion and the behavior prediction of the other road user does not meet at least one of the plurality of sets of preconditions, discard the planned trajectory.

DETAILED DESCRIPTION

Overview

Figure 1:
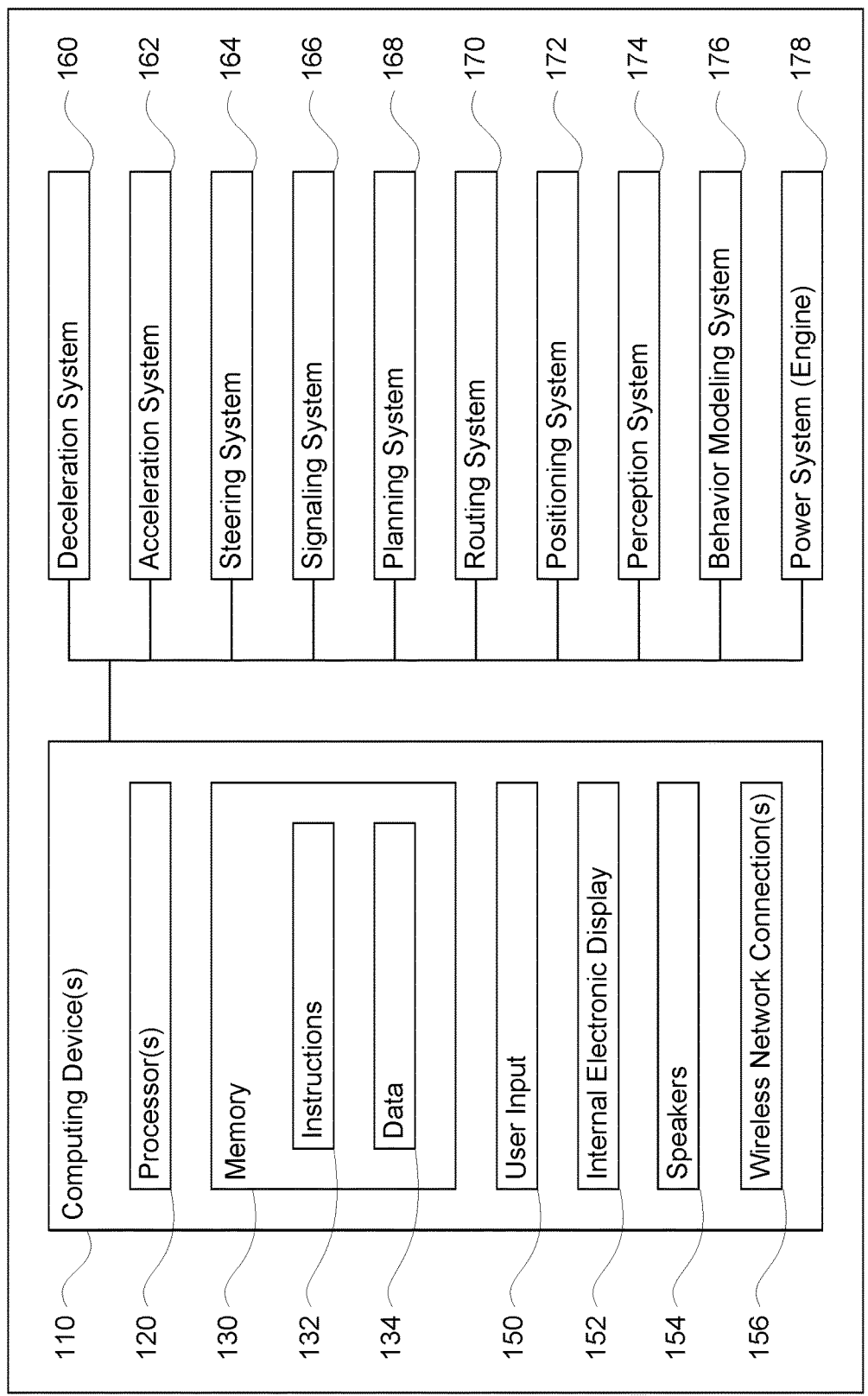
FIG. 1 is a functional diagram of an example vehicle in accordance with an exemplary embodiment.

The technology relates to planning trajectories for autonomous vehicles while taking into account how the autonomous vehicle's behavior may affect the behaviors of other road users such as other vehicles, bicyclists, pedestrians, etc. For instance, a typical planning system for an autonomous vehicle may utilize a set of predicted future trajectories for the other agents in the scene to make informed decisions about the autonomous vehicle's planned trajectory. When these predictions are made independently from the planning system, they do not incorporate what the autonomous vehicle is planning to do. In some cases, independent predictions may be conditioned on an expectation of the autonomous vehicle's behavior that can differ from what is actually being planned in a new trajectory. A planning system that simply minimizes conflicts with independently predicted trajectories may fail to model how the autonomous vehicle behavior influences the behaviors of other agents and does not make well-informed decisions.

For example, if an autonomous vehicle is considering a lane change but has not toggled its turn signal or steadily begun to shift laterally within its lane, it may not be evident to an independent prediction system (or other human drivers) that the autonomous vehicle could initiate a lane change. Thus, behavior predictions for other road users may not incorporate this possibility. While a joint planning and prediction system may be able to model these intricate interactions, such modeling is computationally difficult to do robustly for a real-time planning system for an autonomous vehicle.

To address this, a planning system may incorporate the behavior predictions or trajectories of other agents in the scene given a partial planned trajectory for the autonomous vehicle under real time compute constraints. To do so, planned trajectories may be analyzed in a piecemeal fashion. For instance, each planned trajectory may provide a planned path and other instructions for an autonomous vehicle to follow for some brief period of time into the future. This may be divided further into even shorter periods or sub portions.

For each sub portion of the planned trajectory, the planning system may determine whether that sub portion conflicts with a behavior prediction of another road user. If not, the process continues to the next sub portion of the planned trajectory and so on. In this regard, where there are multiple planned trajectories with overlapping sub portions, for efficiency, the processing for such overlapping portions may be performed only once.

Once a sub portion of a planned trajectory that conflicts with a behavior prediction of another road user is found, the planning system may determine whether the sub portion and the other road user's behavior prediction satisfies one or more sets of preconditions. Each set of preconditions may define a specific scenario and may be associated with one or more potential reactions.

If one or more sets of preconditions are met, the planned trajectory may be annotated with a potential reaction by the other road user. In this regard, the annotation may indicate that the other road user is likely to react to the planned trajectory. In some instances, there may be multiple other road users who are likely to react to a planned trajectory, such as when the autonomous vehicle is merging or changing lanes into a line of other vehicles. In this regard, a particular planned trajectory may have multiple annotations.

If one or more sets of preconditions are not met, the planned trajectory may be discarded. This may be because the planned trajectory may be likely to lead to a possible collision between the autonomous vehicle and the other road user.

The annotated planned trajectories and any planned trajectories that were not annotated may then be used for other downstream planning system and non-planning system components. For instance, the planning system and/or another system of the vehicle may analyze these trajectories in order to select one for controlling the vehicle, for example, using a cost analysis. In the instances where an annotated planned trajectory is selected, the annotation can be used to ignore or adjust the original behavior prediction of the other road user, for example, by reshaping the behavior prediction to a path consistent with the annotated reaction. This may include assuming the other road user will slow down, change lanes, etc.

The features described herein may allow autonomous vehicles to better take into account how another road user will respond to a planned trajectory of an autonomous vehicle. This may result in the autonomous vehicle following better and safer trajectories which result in fewer close interactions with other road users. Moreover, the features described herein may provide real-time computational gains by restricting the application of reactions to interactions that satisfy a specific set of preconditions and selecting one as the representative for the agent's future instead of enumerating many possible futures.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g. garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
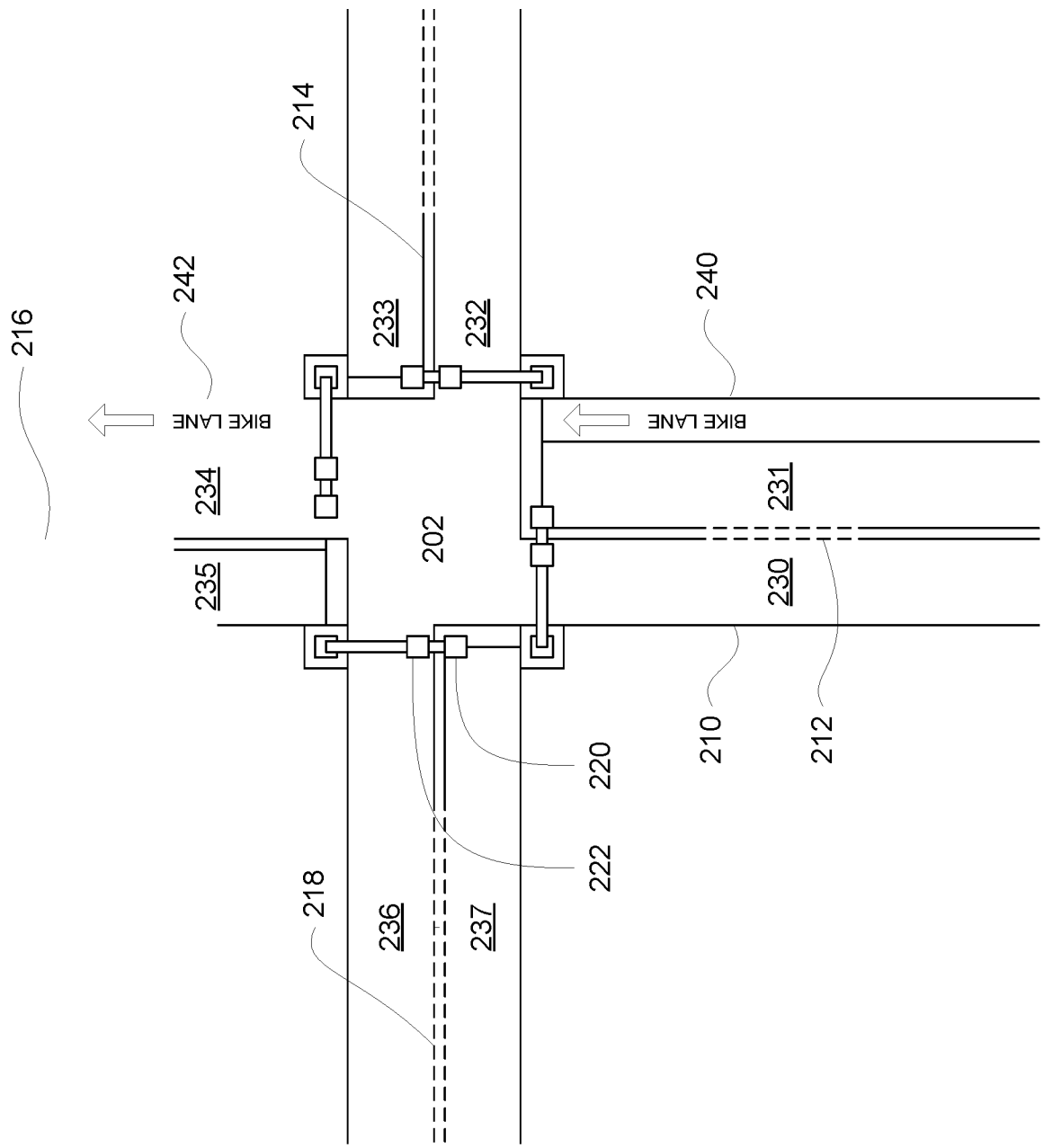
FIG. 2 is an example of map information in accordance with aspects of the disclosure.

FIG. 2 is an example of map information 200 for a section of roadway including intersection 202. The map information 200 may be a local version of the map information stored in the memory 130 of the computing devices 110. In this example, the map information 200 includes information identifying the shape, location, and other characteristics of lane lines 210, 212, 214, 216, 218 which define the shape and location of lanes 230, 231, 232, 233, 234, 235, 236, 237. The map information may also store information about the location, shape and configuration of traffic controls such as traffic signal lights 220, 222 as well as stop signs, yield signs, and other signs (not shown). The map information may also include other information that allows the computing devices 110 to determine whether the autonomous vehicle has the right of way to complete a particular maneuver (i.e. complete a turn or cross a lane of traffic or intersection).

In addition, the map information may include additional details such as the characteristics (e.g. shape, location, configuration etc.) of traffic controls including traffic signal lights (such as traffic signal lights 220, 222), signs (such as stop signs, yield signs, speed limit signs, road signs, and so on), crosswalks, sidewalks, curbs, buildings or other monuments, etc. For instance, as shown in FIG. 2, the map information identifies the shape and location of bicycle lanes 240, 242.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
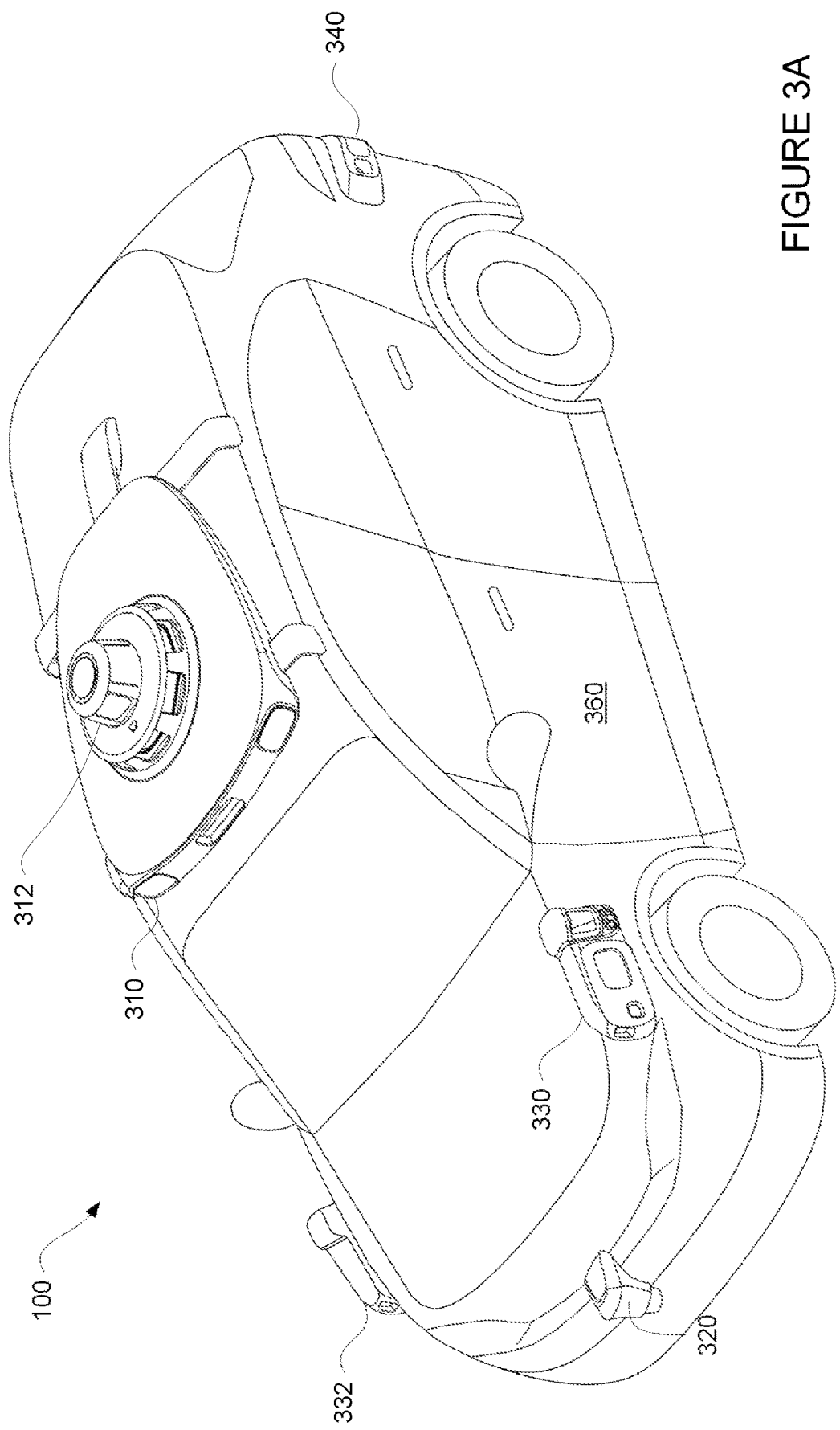
FIG. 3A-3B are example external views of a vehicle in accordance with aspects of the disclosure.
Figure 3B:
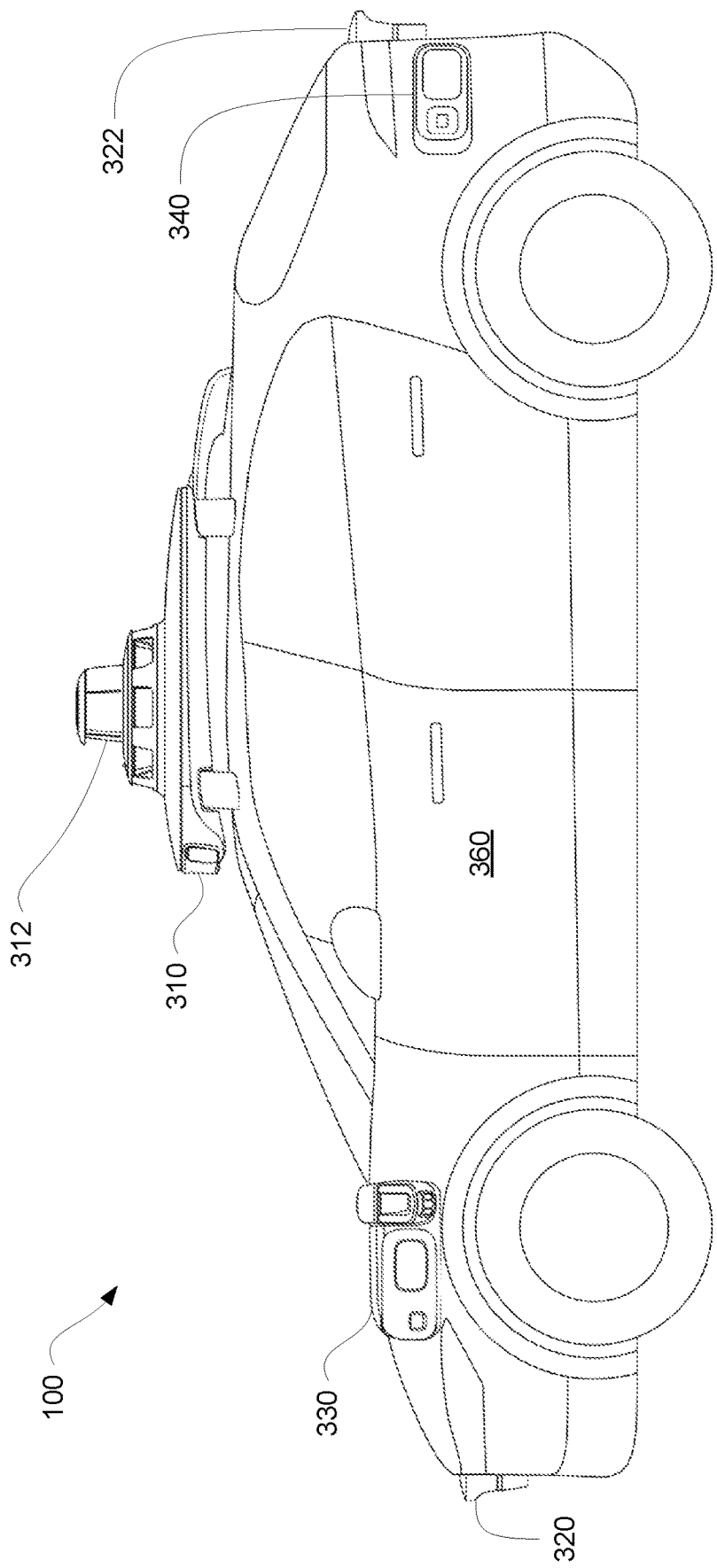

For instance, FIGS. 3A-3B are an example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g. future behavior predictions or predicted future trajectories). In this regard, different models may be used for different types of objects, such as pedestrians, bicyclists, vehicles, etc. The behavior predictions or predicted trajectories may be a list of positions and orientations or headings (e.g. poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination. A control system software module of computing devices 110 may be configured to control movement of the vehicle, for instance by controlling braking, acceleration and steering of the vehicle, in order to follow a trajectory.

The Computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
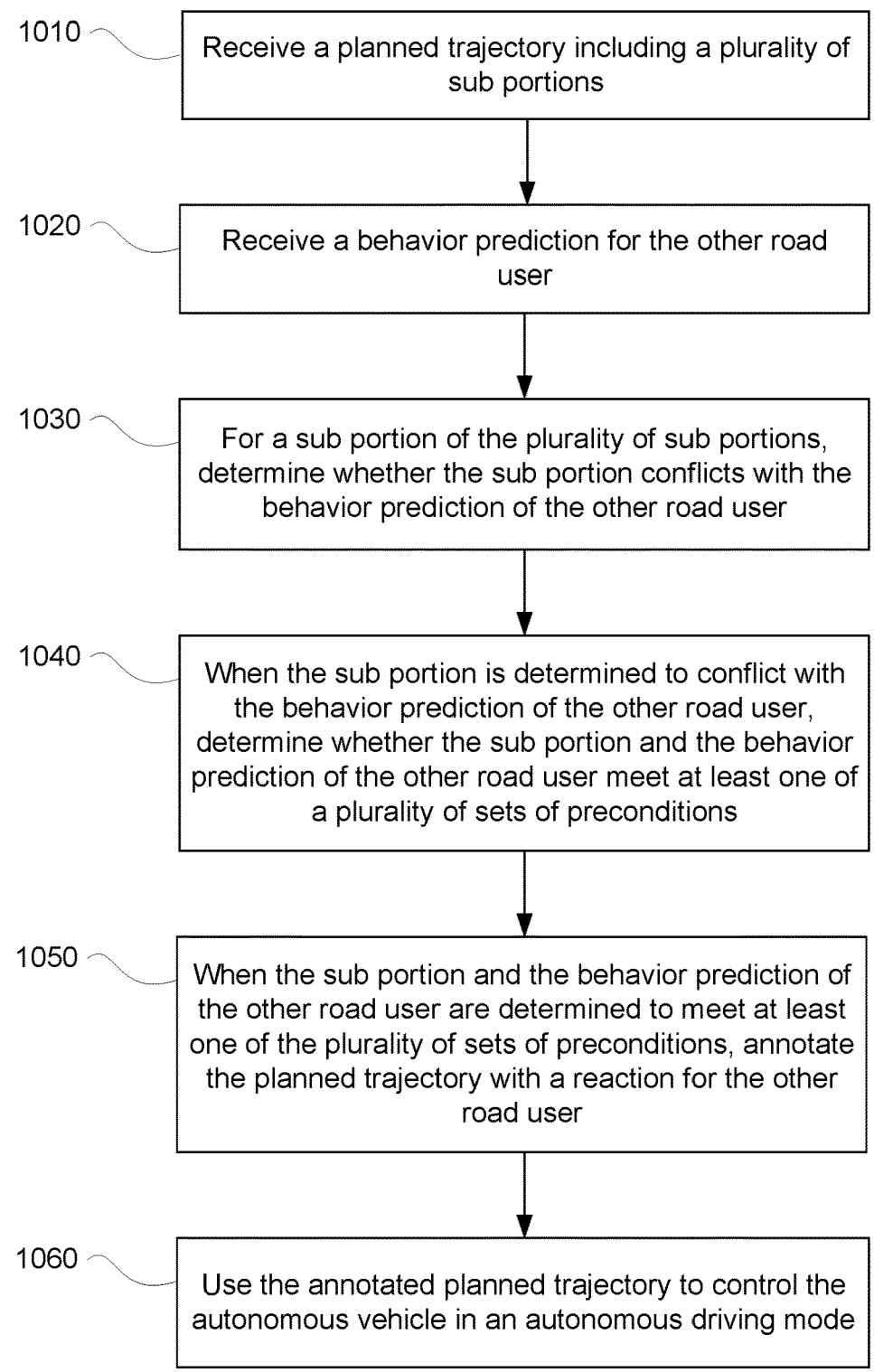
FIG. 10 is an example flow diagram in accordance with aspects of the disclosure.

FIG. 10 is an example flow diagram 1000 for processing trajectories for autonomous vehicles which may be performed by one or more processors, such as the one or more processors 120 of the computing devices 110 of autonomous vehicle 100 or other processors of the autonomous vehicle 100, such as the processors of computing devices of the planning system 168. At block 1010, a planned trajectory including a plurality of sub portions is received.

Figure 4:
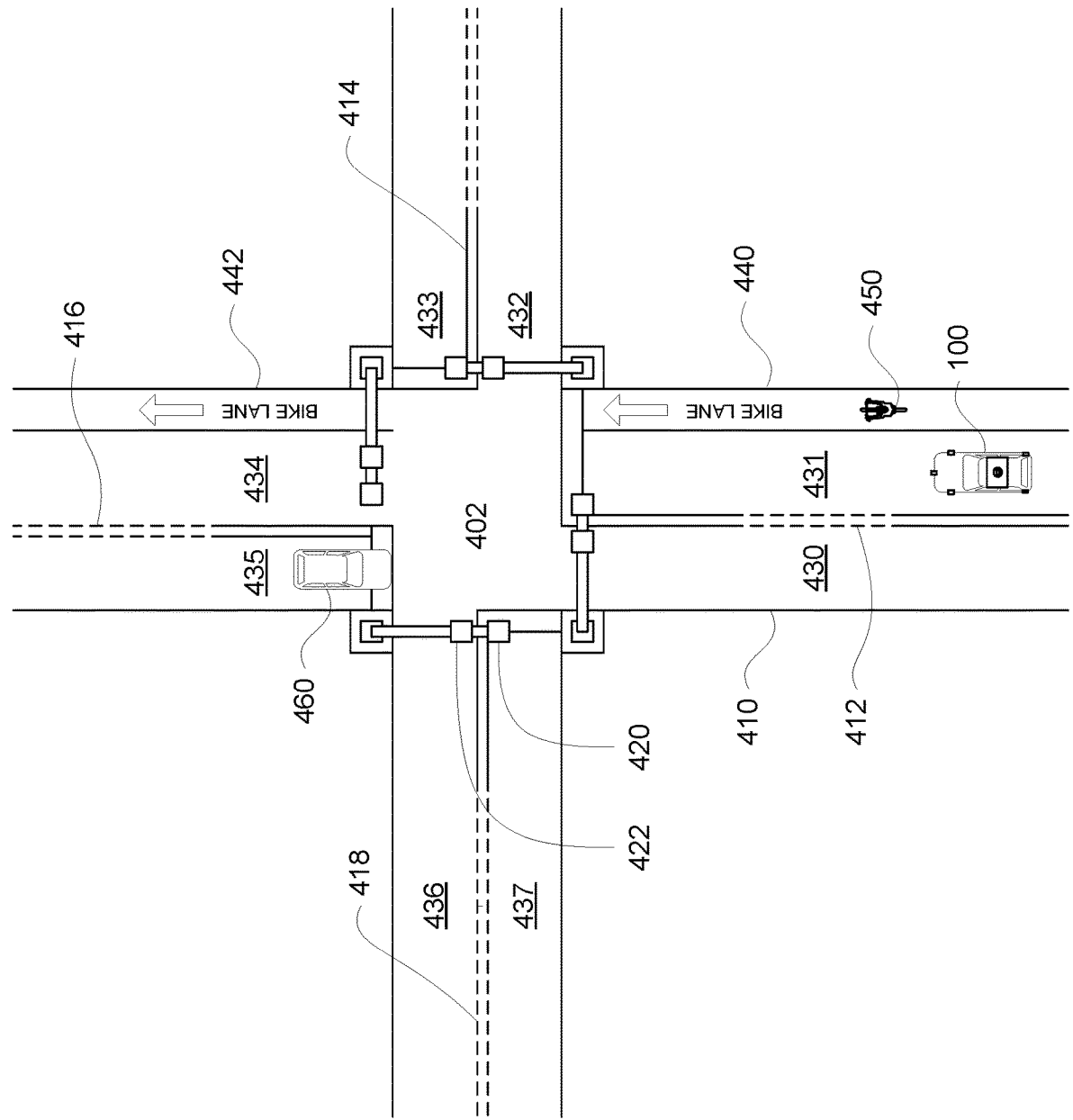
FIG. 4 is an example depiction of a section of roadway in accordance with aspects of the disclosure.

As noted above, as the autonomous vehicle 100 moves through its environment, the perception system 172 may generate sensor data which is used to detect and identify objects in the autonomous vehicle's environment. For example, FIG. 4 depicts a section of roadway 400 corresponding to the map information 200. In this example, the shape, location and configuration of intersection 402 corresponds to the shape, location and configuration of intersection 202, the shape, location and configuration of lane lines 410, 412, 414, 416, 418 corresponds to the shape, location and configuration of lane lines 210, 212, 214, 216, 218, respectively, the shape, location and configuration of lanes 430, 431, 432, 433, 434, 435, 436, 437 corresponds to the shape, location and configuration of lanes 230, 231, 232, 233, 234, 235, 236, 237, respectively, the shape, location and configuration of traffic signal lights 420, 422 correspond to the shape, location and configuration of traffic signal lights 220, 222, respectively, and the shape, location and configuration of bicycle lanes 440, 442 corresponds to the shape, location and configuration of bicycle lanes 240, 242, respectively. In this example, autonomous vehicle 100 is in lane 231 approaching intersection 202, and the vehicle's perception system 174 has detected objects 450, 460. For instance, objects 450, 460 may correspond to road user objects such as a bicyclist and a car, respectively.

As indicated above, the sensor data from the perception system 172 as well as other information is used by the planning system 168 to generate trajectories as described above. These trajectories may then be analyzed by the one or more processors 120 of the computing devices 110 of autonomous vehicle 100 or other processors of the autonomous vehicle 100, such as the processors of computing devices of the planning system 168. As noted above, each planned trajectory may provide a planned path and other instructions for an autonomous vehicle to follow for some brief period of time into the future, such as 10 seconds or more or less. This may be divided further into even shorter periods or sub portions each representing a fixed period of time along the trajectory of 0.1 second or more or less. Thus, each planned trajectory may include a plurality of sub portions.

Figure 5:
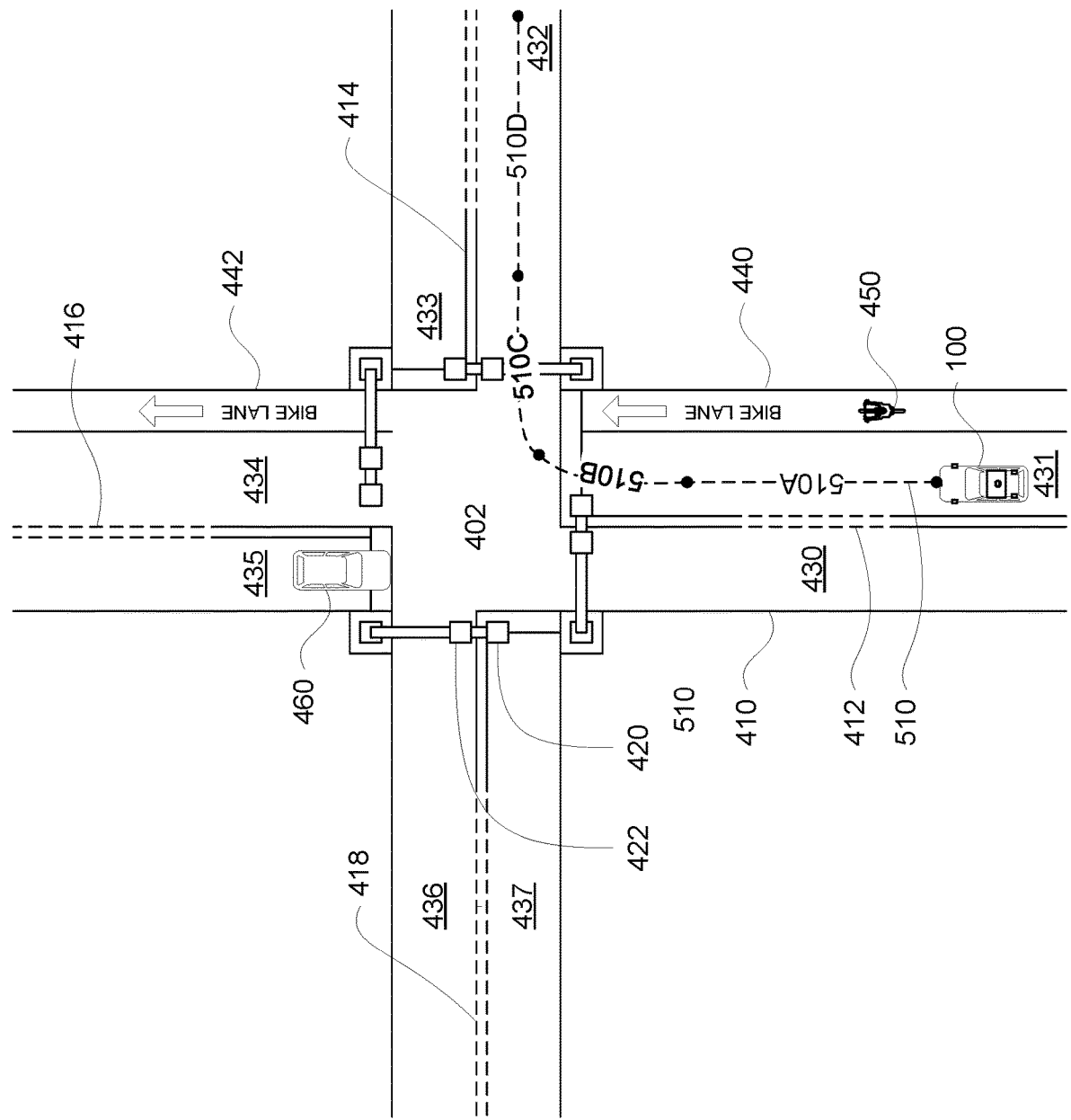
FIG. 5 is an example depiction of a section of roadway and a planned trajectory in accordance with aspects of the disclosure.

FIG. 5 depicts the information represented in FIG. 4 overlaid with a planned trajectory 510 generated by the planning system 168 for the autonomous vehicle to follow in order to make progress towards a destination. In this example, the planned trajectory 510 has the autonomous vehicle following lane 431 (lane 231), making a right turn at intersection 402 (intersection 202), and entering into lane 432 (lane 232). In addition, the planned trajectory 510 includes a plurality of sub portions 510A, 510B, 510C, 510D. Each of these sub portions represents a fixed period of time along the trajectory (in this example, greater than the 0.1 second example provided above for simplicity and ease of understanding).

Returning to FIG. 10, at block 1020, a behavior prediction of another road user is received. For instance, as indicated above, the vehicle's perception system. For instance, as noted above the behavior modeling system 176 may generate behavior predictions for other road users based on characteristics of those other road users generated by the perception system 172. As noted above, the behavior predictions or predicted trajectories may be a list of positions and orientations or headings (e.g. poses) as well as other predicted characteristics such as speed, acceleration or deceleration, rate of change of acceleration or deceleration, etc.

Figure 6:
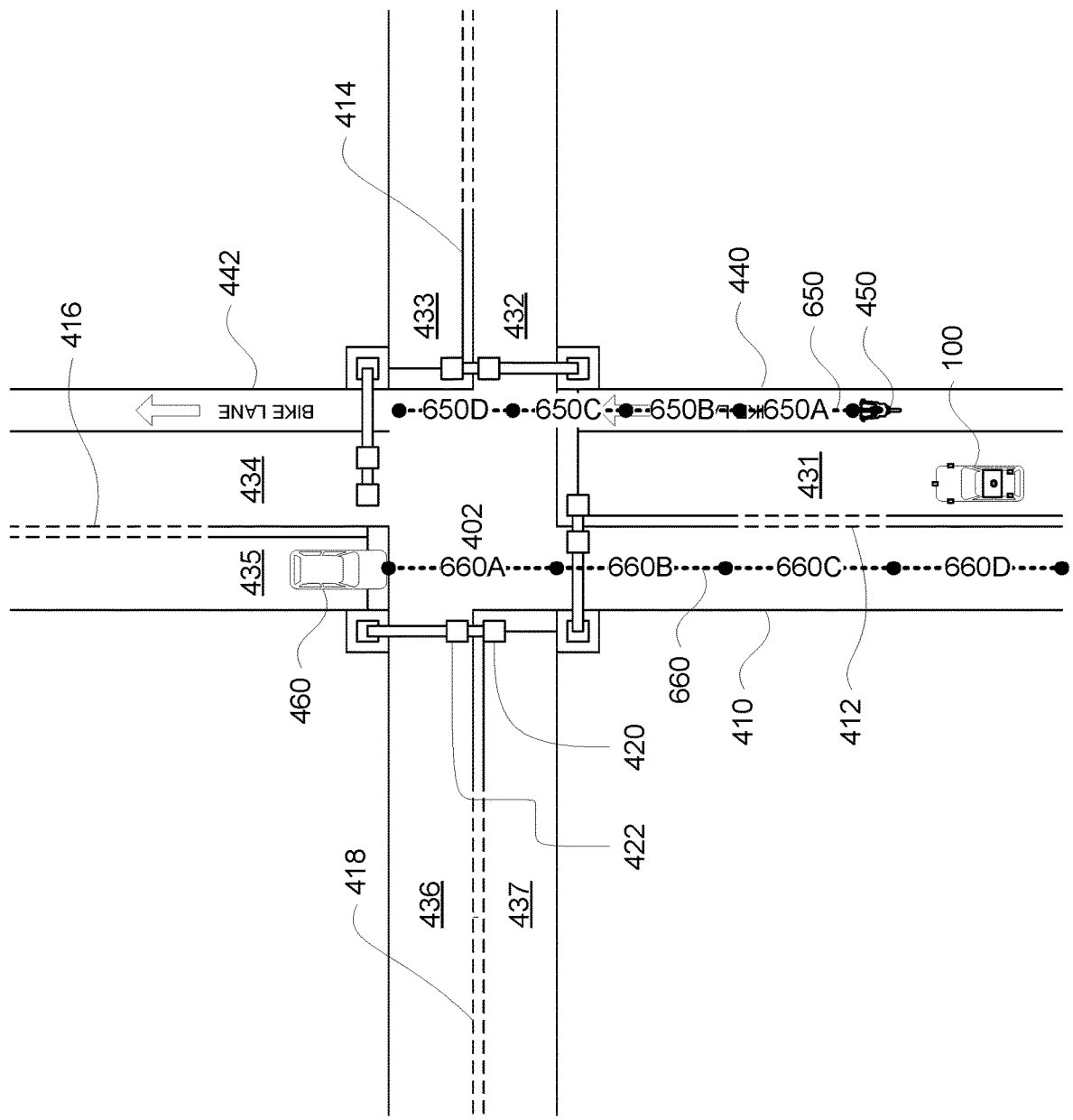
FIG. 6 is an example depiction of a section of roadway and behavior predictions in accordance with aspects of the disclosure.

FIG. 6 depicts the information represented in FIG. 4 overlaid with a behavior prediction 650 for the object 450 generated by the behavior modeling system 176. As shown in FIG. 6, a behavior prediction 650 has the object 450 traveling in the bicycle lane 440 (bicycle lane 240), through intersection 402 (intersection 202), and continuing towards bicycle lane 442 (bicycle lane 242). In this example, the behavior prediction 650 is depicted with sub portions 650A, 650B, 650C, 650D representing fixed periods of time corresponding to the fixed periods of time of the sub portions 510A, 510B, 510C, 510D, respectively. In this way, the example depicts not only the locations of the behavior prediction 650, but also how these locations change over time. Similarly, a behavior prediction 660 has the object 460 traveling in the lane 435 (lane 235, through intersection 402 (intersection 202), and continuing into and along the lane 430 (lane 230). In this example, the behavior prediction 660 is depicted with sub portions 660A, 660B, 660C, 660D representing fixed periods of time corresponding to the fixed periods of time of the sub portions 510A, 510B, 510C, 510D, respectively. In this way, the example depicts not only the locations of the behavior prediction 660, but also how these locations change over time.

Returning to FIG. 10, at block 1030, for a sub portion of the plurality of sub portions, whether the sub portion conflicts with the behavior prediction of the other road user is determined. For each sub portion of the planned trajectory, the planning system may determine whether that sub portion conflicts with a behavior prediction of another road user. As an example, conflicting may include overlapping, the autonomous vehicle venturing too close to the other road user in space or time (e.g. within a predetermined distance in space or time, or some other trigger or potential motion of the autonomous vehicle in the sub portion necessitates a reaction by the other road user to the potential motion by the autonomous vehicle.

The exact values of the predetermined distance in space or time may depend upon the context in which the autonomous vehicle is driving. For instance, these values may be dependent upon the "comfort" of a passenger of the autonomous vehicle or that of other road users. Such persons may react if the autonomous vehicle comes too close (in time or space) to the current trajectory of another road user. In this regard, "too close" in this instance may be defined by a speed-distance curve that defines the uncomfortable threshold as a function of both relative speed and distance between the autonomous vehicle and the other road user. For example, for two objects (e.g. the autonomous vehicle and another road user) moving parallel to one another with a relatively small difference in their velocities (e.g. close to 0 miles per hour), too close may be <25 cm or more or less for another vehicle or <50 cm or more or less for a bicyclist. The predetermined time may also depend on the relative velocity at the time of the conflict; the predetermined time may increase as the relative difference in velocity increases. In other words, if the other road user must brake "uncomfortably hard" to avoid the conflict, this may be considered too close in time.

In this regard, a conflict may be considered any type of a high-risk interaction including a collision between the autonomous vehicle and the other user along a planned trajectory and behavior prediction, respectively. If not, the process continues to the next sub portion of the planned trajectory and so on.

Figure 7:
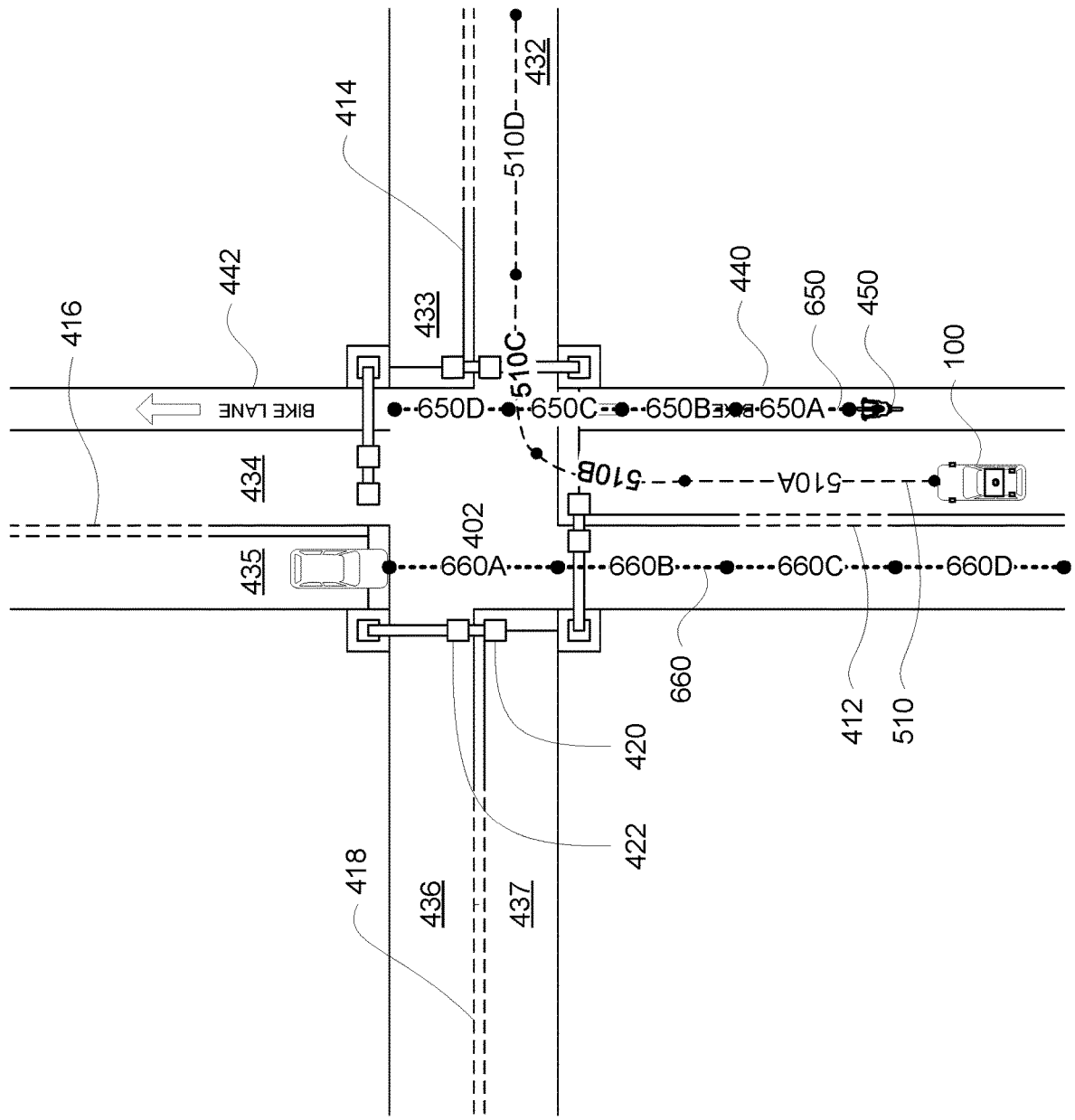
FIG. 7 is an example depiction of a section of roadway, behavior predictions, and a planned trajectory in accordance with aspects of the disclosure.

FIG. 7 depicts the section of roadway 400 with the planned trajectory 510 and behavior prediction 650 for the object 450 as well as the behavior prediction 660 for the object 460. As indicated above, the process may iterate through the sub portions of the planned trajectory and compare those sub portions to corresponding sub portions of the behavior predictions of any other road users. At sub portion 510A, there is no conflict between the planned trajectory 510 and either of the corresponding sub portions (650A, 660A) of the behavior predictions 650, 660. Similarly, at sub portion 510B, there is no conflict between the planned trajectory 510 and either of the corresponding sub portions (650B, 660B) of the behavior predictions 650, 660. At sub portion 510C, while there is no conflict between the planned trajectory 510 and the corresponding sub portion (660C), the behavior prediction 650 overlaps with the sub portion 510C at sub portion 650C. Thus, there is a conflict between the sub portion 510C and the behavior prediction 650. Finally, at sub portion 510D, there is no conflict between the planned trajectory 510 and either of the corresponding sub portions (650D, 660D) of the behavior predictions 650, 660.

Figure 8:
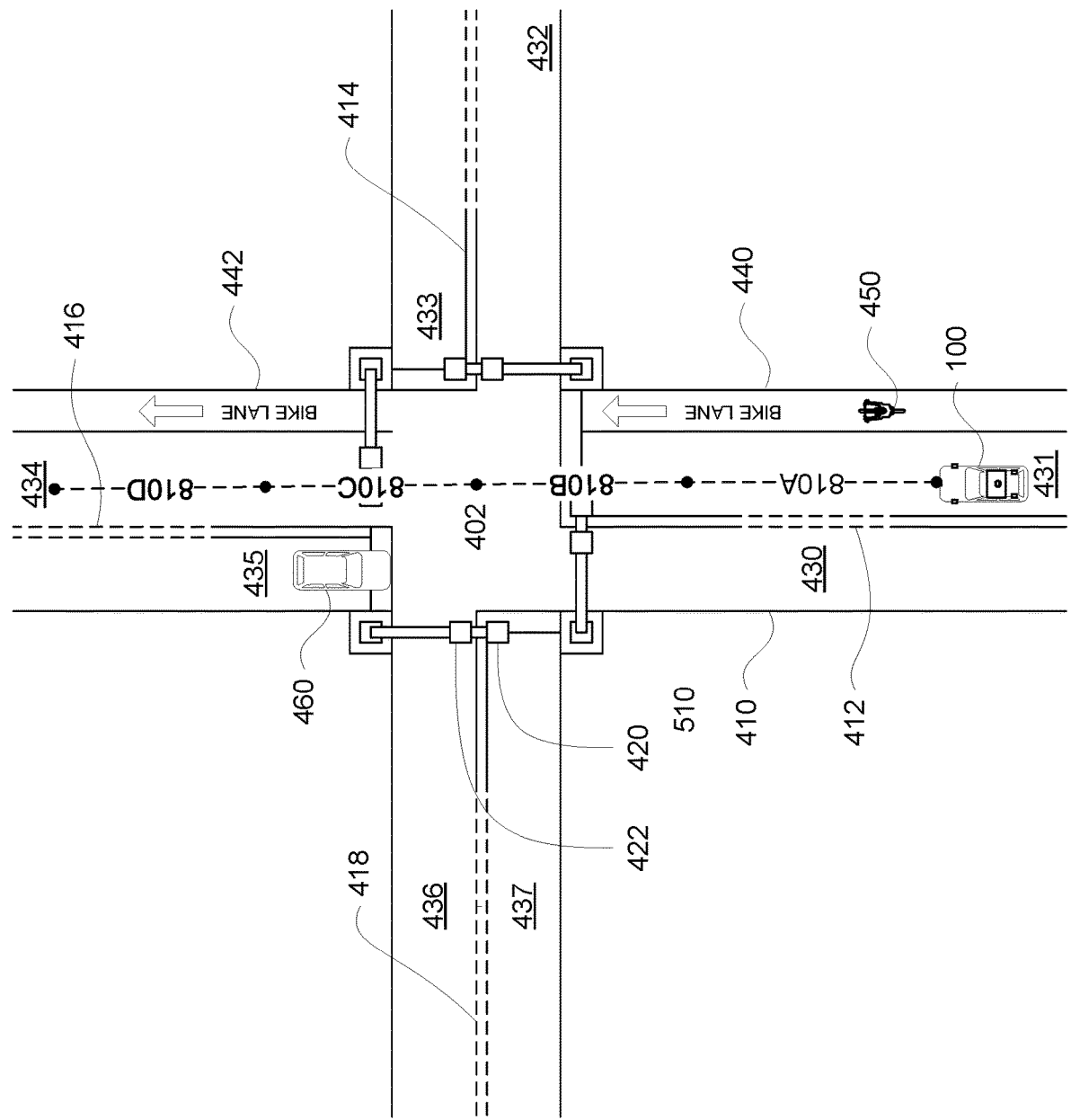
FIG. 8 is an example depiction of a section of roadway and a planned trajectory in accordance with aspects of the disclosure.

In examples where there are multiple planned trajectories with overlapping sub portions, for efficiency, the processing for such overlapping portions may be performed only once. For instance, FIG. 8 depicts a second planned trajectory 810 that proceeds through intersection 402 (intersection 202) and enters into lane 434 (lane 234). In this example, the second planned trajectory 810 includes a plurality of sub portions 810A, 810B, 810C, 810D. Each of these sub portions representing a fixed period of time along the second planned trajectory 810 corresponding to the fixed periods of time of the sub portions 510A, 510B, 510C, 510D, respectively. In this example, the sub portion 810A perfectly overlaps (is the same as) sub portion 510A, respectively. In this example, the planning system 168 need not process sub portion 810A for the second planned trajectory 810 as the result is the same when these sub portions were processed for the planned trajectory 510. In this regard, the results of the processing of sub portion 510A may be used to determine whether there are conflicts along the corresponding sub portion (810A) of the second planned trajectory 810.

Returning to FIG. 10, at block 1040, when the sub portion is determined to conflict with the behavior prediction of the other road user, whether the sub portion and the behavior prediction of the other road user meet at least one of a plurality of sets of preconditions is determined. For instance, once a sub portion of a planned trajectory that conflicts with a behavior prediction of another road user is found, the planning system may determine whether the sub portion (and any other sub portions up until that sub portion of the planned trajectory) and the other road user's behavior prediction satisfies one or more sets of preconditions. As indicated above, there is a conflict between the sub portion 510C and the behavior prediction 650, and thus, the planning system 168 may determine whether the sub portion 510C and the behavior prediction 650 meet at least one of a plurality of sets of preconditions.

Each set of preconditions may define a specific scenario. For instance, a set of preconditions may be that the autonomous vehicle is attempting a particular maneuver, the other road user is behind the autonomous vehicle, and that the other road user has room and time to stop (e.g. reasonably and comfortable, that is within some predetermined acceptable deceleration constraints) for the autonomous vehicle. Examples of the particular maneuver may include a lane change, merging, making an unprotected turn (e.g. where other traffic is not subject to a traffic control such as a stop sign, traffic light or other traffic signal), U-turns, narrow lanes or roads, moving around double-parked vehicles or vehicles otherwise stopped in a lane, entering a roundabout, pulling over or parallel parking, crossing over a lane of traffic, or crossing over a bicycle lane.

Each set of preconditions may be associated with one or more potential reactions. For instance, a set of preconditions relating to lane changing could identify many possible reactions by another road user in another vehicle including, for example: no reaction, such as when a driver of the other vehicle is not paying attention; react early and comfortably, such as when the driver slows to allow the autonomous vehicle to pass in front; react late and uncomfortably such as when the driver of the other vehicle tries to jockey for positioning with the autonomous vehicle, and so on. In this regard, the reaction is dependent upon the context in which the autonomous vehicle 100 is driving.

For instance, turning to the example of FIG. 7, in one instance, a set of preconditions may include that a bicyclist is moving slower than the autonomous vehicle 100, and that the bicyclist must decelerate no more than −1 meter per second squared to maintain at least 1 meter of distance (clearance) from the autonomous vehicle at the time that the autonomous vehicle and bicyclist cross paths. This set of preconditions may be associated with a reaction of the bicyclist braking gently to allow the autonomous vehicle to pass in front or ahead of the bicyclist. In addition or alternatively, another set of preconditions may include the autonomous vehicle 100 and the bicyclist having similar velocities (i.e. a small relative difference in velocities) and that the bicyclist is not able to slow down at a comfortable deceleration profile (e.g. no more than −1 meter per second squared to maintain at least 1 meter of distance from the autonomous vehicle at the time that the autonomous vehicle and bicyclist cross path) to allow the autonomous vehicle to pass in front of the bicyclist. This set of preconditions may be associated with a reaction of the bicyclist not slowing down at all. Thus, different sets of preconditions may be used for different types of road users, for instance, as "comfortable" deceleration profiles for bicyclists and vehicles may differ.

Returning to FIG. 10, at block 1050, when the sub portion and the behavior prediction of the other road user are determined to meet at least one of the plurality of sets of preconditions, the planned trajectory is annotated with a reaction for the other road user. In this regard, if one or more sets of preconditions are met, the planned trajectory may be annotated with a potential reaction by the other road user. In this regard, the annotation may indicate that the other road user is likely to react to the planned trajectory, for instance by one of stopping, decelerating or nudging. In some instances, there may be multiple other road users who are likely to react to a planned trajectory, such as when the autonomous vehicle is merging or changing lanes into a line of other vehicles. In this regard, a particular planned trajectory may have multiple annotations. In some instances, the annotation may encode additional information about the other road user's expected reaction, like the adjusted trajectory of the object after applying the reaction, the magnitude of the acceleration/deceleration or steering jerk, time to react, etc. Such details may even enable the autonomous vehicle to assess the comfort or discomfort imposed on the other road user for use in downstream planning system 168 and non-planning system components.

Figure 9:
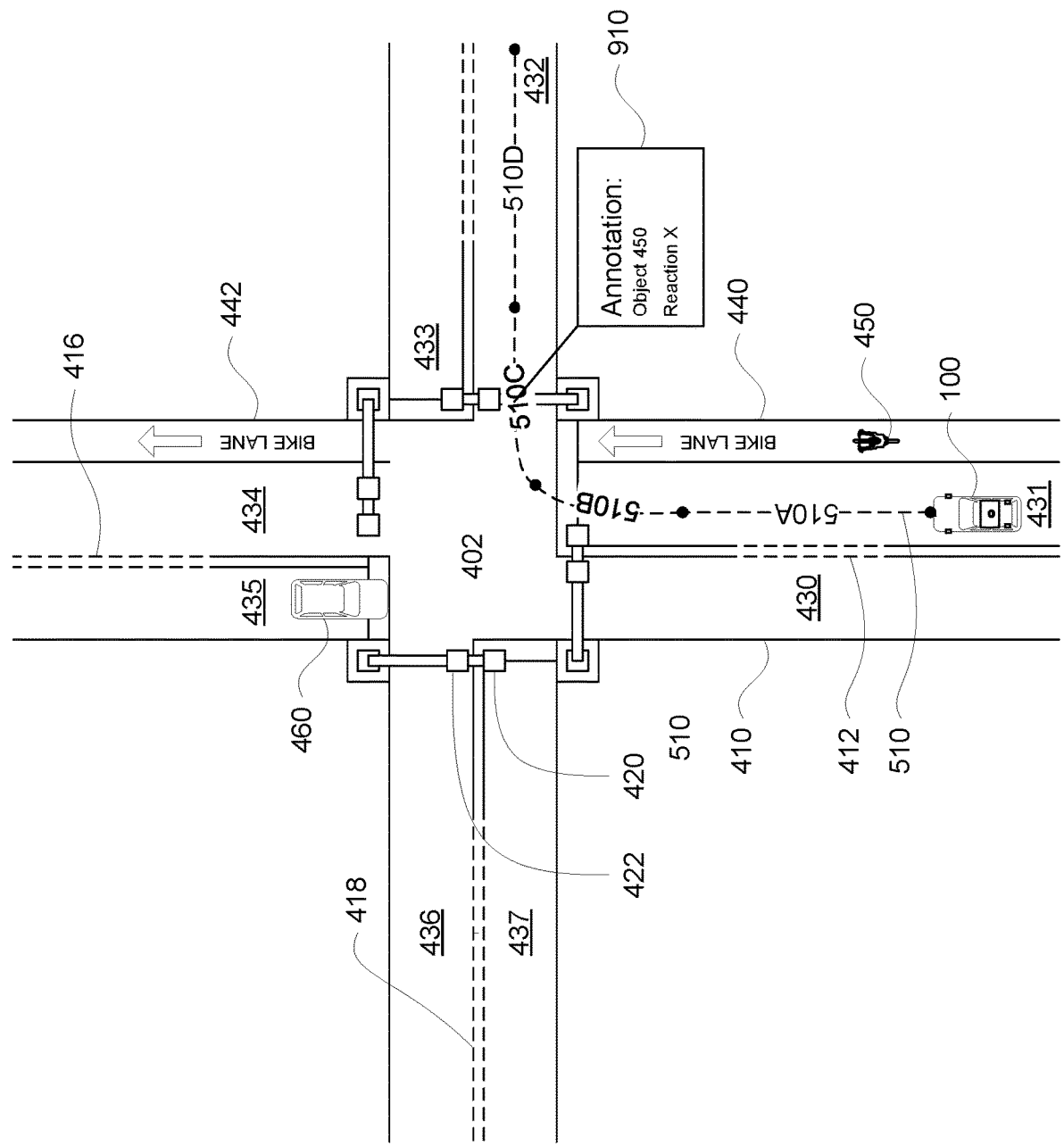
FIG. 9 is an example depiction of a section of roadway, a planned trajectory, and a representative annotation in accordance with aspects of the disclosure.

FIG. 9 represents the information of FIG. 4 with the addition of a representation of an annotation 910 for the planned trajectory 510 indicating that the object 450 is likely to react to the planned trajectory 510 by performing some action "Reaction X". In this example, Reaction X may correspond to the reaction or reactions associated with any of the sets of preconditions that are met. As an example, Reaction X may include the object 450 reacting by slowing down for the autonomous vehicle 100 to pass in front of the object 450 as in the example above and/or the object reacting by not slowing down (again depending upon the context of the situation). In addition, annotation 910 X is associated with sub portion 510C. In this regard, different sub portions of a planned trajectory may be associated with different annotations.

In some instances, when a set of preconditions has more than one associated potential reaction and/or if more than one set of preconditions is met, the planning system can select one for the annotation. For instance, a ranking function which selects the most comfortable reaction (e.g. the one with the least amount of acceleration or deceleration of the other road user).

If one or more sets of preconditions are not met, the planned trajectory may be discarded. This may be because the planned trajectory may be likely to lead to a possible collision between the autonomous vehicle and the other road user.

Returning to FIG. 10, at block 1060, the annotated planned trajectory is used to control the autonomous vehicle in an autonomous driving mode. The annotated planned trajectories and any planned trajectories that were not annotated (but not otherwise discarded) may then be used for other downstream planning system 168 and non-planning system components. For instance, the planning system and/or another system of the vehicle may analyze these trajectories in order to select one for controlling the vehicle, for example, using a cost analysis. For example, as noted above, the computing devices 110 may control the various systems of the autonomous vehicle 100 in order to cause the autonomous vehicle to follow the selected trajectory towards the destination. In the instances where an annotated planned trajectory is selected, the annotation can be used to ignore or adjust the original behavior prediction of the other road user, for example, by reshaping the behavior prediction to a path consistent with the annotated reaction. This may include assuming the other road user will slow down, change lanes, etc.

Although the features herein are described in relation to a fully autonomous driving mode, all or some aspects of the disclosure may be used in conjunction with partially autonomous driving modes and/or manual driving models. For instance, the features described herein may be useful for blind-spot assistance. In such instances, a behavior modeling system could generate a predicted path of a vehicle which could be used for the planned trajectory in the examples described above. This behavior prediction need not necessarily be as sophisticated as the planning system 168, but could simply project a few maneuvers ahead, e.g., going straight along the road or shifting lanes given input such as map information and/or sensor data generated by a perception system similar to perception system 174. Alternatively, the planning system 168 could still generate planned trajectories to be used as described above such as if autonomous vehicle 100 were operating in a manual driving or a semi-autonomous driving mode, and the planning system 168 was still provided with a destination for the autonomous vehicle. For example, if a human driver or operator attempts to change lanes with another road user (e.g. another vehicle) in a blind spot or if there are pedestrians or bicyclists that might unexpectedly cross the path of a vehicle, the aforementioned features could be used to engage an override or warning protecting the manual driver from completing their maneuver. In this regard, the features described herein may be used to provide driver assistance by controlling the vehicle to avoid a collision or other situation and/or to signal a driver or other person in the vehicle to various information such as by visual or audible notifications provided via a display or speakers of the autonomous vehicle 100.

The features described herein may allow autonomous vehicles to better take into account how another road user will respond to a planned trajectory of an autonomous vehicle. This may result in the autonomous vehicle following better and safer trajectories which result in fewer close interactions with other road users. Moreover, the features described herein may provide real-time computational gains by restricting the application of reactions to interactions that satisfy a specific set of preconditions and selecting one as the representative for the agent's future instead of enumerating many possible futures.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method of processing trajectories for vehicles having an autonomous driving mode, the method comprising;
   receiving, at a point in time by one or more processors, a planned trajectory of a vehicle having the autonomous driving mode, the planned trajectory being represented by a first plurality of sub portions, each sub portion of the first plurality of sub portions corresponding to a fixed increment of time along the planned trajectory;
   receiving, at the point in time by the one or more processors, a behavior prediction for another road user, the behavior prediction being represented by a second plurality of sub portions, each sub portion of the second plurality of sub portions corresponding to the fixed increment of time along the behavior prediction;
   for a sub portion of the first plurality of sub portions associated with a particular period of time relative to the point in time, determining, by the one or more processors, whether the sub portion of the first plurality of sub portions conflicts with a sub portion of the second plurality of sub portions associated with the particular period of time relative to the point in time;

when the sub portion of the first plurality of sub portions is determined to conflict with the sub portion of the second plurality of sub portions, determining, by the one or more processors, whether the sub portion of the first plurality of sub portions and the sub portion of the second plurality of sub portions meet at least one of a plurality of sets of preconditions;

when the sub portion of the first plurality of sub portions and the sub portion of the second plurality of sub portions are determined to meet the at least one of the plurality of sets of preconditions, annotating, by the one or more processors, the sub portion of the first plurality of sub portions with a reaction for the other road user; and using, by the one or more processors, the annotated sub portion to control the vehicle in the autonomous driving mode.

2. The method of claim 1, wherein the sub portion of the first plurality of sub portions is determined to conflict with the sub portion of the second plurality of sub portions in response to determining, by the one or more processors, that the sub portion of the first plurality of sub portions intersects the sub portion of the second plurality of sub portions.

3. The method of claim 1, wherein the sub portion of the first plurality of sub portions is determined to conflict with the sub portion of the second plurality of sub portions in response to determining, by the one or more processors, that the sub portion of the first plurality of sub portions is within a predetermined distance of the sub portion of the first plurality of sub portions.

4. The method of claim 1, wherein the sub portion of the first plurality of sub portions is determined to conflict with the sub portion of the second plurality of sub portions in response to determining, by the one or more processors, that a potential motion of the vehicle along a portion of the planned trajectory represented by the sub portion of the first plurality of sub portions necessitates a reaction by the other road user to the potential motion.

5. The method of claim 1, wherein each of the plurality of sets of preconditions corresponds to a specific scenario.

6. The method of claim 1, wherein each of the plurality of sets of preconditions includes the vehicle attempting a particular maneuver.

7. The method of claim 6, wherein the particular maneuver includes a lane change.

8. The method of claim 6, wherein the particular maneuver includes merging with other road users.

9. The method of claim 6, wherein the particular maneuver includes making an unprotected turn.

10. The method of claim 6, wherein the particular maneuver includes crossing over a lane of traffic.

11. The method of claim 6, wherein the particular maneuver includes crossing over a bicycle lane.

12. The method of claim 1, wherein the at least one of the plurality of sets of preconditions includes the other road user approaching the vehicle from behind.

13. The method of claim 1, wherein the at least one of the plurality of sets of preconditions includes the other road user being able to stop within predetermined deceleration constraints.

14. The method of claim 1, wherein the other road user is a first road user, the method further comprising:

iterating, by the one or more processors using the fixed increment of time, through each sub portion of the first plurality of sub portions to determine whether any sub portion of the first plurality of sub portions conflict with another behavior prediction of a second road user, the other behavior prediction being represented by a third plurality of sub portions, each sub portion of the third plurality of sub portions corresponding to the fixed increment of time along the other behavior prediction;

when one or more sub portions of the first plurality of sub portions are determined to conflict with one or more sub portions of the third plurality of sub portions, determining whether the one or more sub portions of the first plurality of sub portions and the one or more sub portions of the third plurality of sub portions meet the at least one of the plurality of sets of preconditions; and when the one or more sub portions of the first plurality of sub portions and the one or more sub portions of the third plurality of sub portions are determined to meet the at least one of the plurality of sets of preconditions, further annotating the one or more sub portions of the first plurality of sub portions with another reaction for the second road user.

15. The method of claim 1, further comprising, when the sub portion of the first plurality of sub portions and the sub portion of the second plurality of sub portions are determined to not meet the plurality of sets of preconditions, discarding the planned trajectory.

16. A system for processing trajectories for vehicles, the system comprising one or more processors configured to:

receive, at a point in time, a planned trajectory of a vehicle having an autonomous driving mode, the planned trajectory being represented by a first plurality of sub portions, each sub portion of the first plurality of sub portions corresponding to a fixed increment of time along the planned trajectory;

receive, at the point in time, a behavior prediction of another road user, the behavior prediction being represented by a second plurality of sub portions, each sub portion of the second plurality of sub portions corresponding to the fixed increment of time along the behavior prediction;

for a sub portion of the first plurality of sub portions associated with a particular period of time relative to the point in time, determine whether the sub portion of the first plurality of sub portions conflicts with a sub portion of the second plurality of sub portions associated with the particular period of time relative to the point in time;

when the sub portion of the first plurality of sub portions is determined to conflict with the sub portion of the second plurality of sub portions, determine whether the sub portion of the first plurality of sub portions and the sub portion of the second plurality of sub portions meet at least one of a plurality of sets of preconditions;

when the sub portion of the first plurality of sub portions and the sub portion of the second plurality of sub portions are determined to meet the at least one of the plurality of sets of preconditions, annotate the sub portion of the first plurality of sub portions with a reaction for the other road user; and use the annotated sub portion to control the vehicle in the autonomous driving mode.

17. The system of claim 16, wherein the sub portion of the first plurality of sub portions is determined to conflict with the sub portion of the second plurality of sub portions based on a determination that the sub portion of the first plurality of sub portions intersects the sub portion of the first plurality of sub portions.

18. The system of claim 16, wherein each of the plurality of sets of preconditions includes the vehicle attempting a particular maneuver.

19. The system of claim 16, wherein the one or more processors further configured to:
- iterate, using the fixed increment of time, through each sub portion of the first plurality of sub portions to determine whether any sub portion of the first plurality of sub portions conflict with any sub portion of the second plurality of sub portions;
- when one or more sub portions of the first plurality of sub portions are determined to conflict with one or more sub portions of the second plurality of sub portions, determine whether the one or more sub portions of the first plurality of sub portions and the one or more sub portions of the second plurality of sub portions meet the at least one of the plurality of sets of preconditions; and
- when the one or more sub portions of the first plurality of sub portions and the one or more sub portions of the second plurality of sub portions are determined to meet the at least one of the plurality of sets of preconditions, further annotate the one or more sub portions of the first plurality of sub portions with another reaction for the other road user.

20. The system of claim 16, wherein the one or more processors are further configured to, when the sub portion of the first plurality of sub portions and the sub portion of the second plurality of sub portions are determined to not meet the plurality of sets of preconditions, discard the planned trajectory.

21. The system of claim 16, wherein each of the plurality of sets of preconditions corresponds to a specific scenario.

22. The system of claim 16, wherein the at least one of the plurality of sets of preconditions includes the other road user being able to stop within predetermined deceleration constraints.

\* \* \* \* \*